United States Patent [19]
Yamaguchi et al.

[11] Patent Number: 5,427,196
[45] Date of Patent: Jun. 27, 1995

[54] ELECTRIC MOTOR DRIVE SYSTEM

[75] Inventors: Kozo Yamaguchi; Yoshinori Miyaishi, both of Aichi, Japan

[73] Assignee: Kabushikikaisha Equos Research, Japan

[21] Appl. No.: 85,934

[22] Filed: Jul. 6, 1993

[30] Foreign Application Priority Data

Jul. 8, 1992 [JP] Japan ................... 4-180975

[51] Int. Cl.⁶ ............................... B60K 1/00
[52] U.S. Cl. ......................... 180/65.2; 180/65.6
[58] Field of Search ........... 180/65.1, 65.2, 65.6,
180/165, 65.3, 65.4; 74/847, 665 B; 188/18 R

[56] References Cited

U.S. PATENT DOCUMENTS

| | | | |
|---|---|---|---|
| 3,933,217 | 1/1976 | Eichinger | 180/65.6 |
| 4,405,029 | 9/1983 | Hunt | 180/65.2 |
| 4,930,590 | 6/1990 | Love et al. | 180/65.6 |
| 5,024,113 | 6/1991 | Ito et al. | 180/65.2 |
| 5,343,970 | 9/1994 | Severinsky | 180/65.6 |

FOREIGN PATENT DOCUMENTS 62-95903  5/1987  Japan .

*Primary Examiner*—Richard M. Camby

[57] ABSTRACT

A structure for regulating the rotational direction of the output shaft of a hybrid vehicle is disclosed. The structure comprises a torque generating means for driving a drive wheel; a gear assembly unit including a first to a third element, the first element being adapted to receive a rotation from the torque generating means and the second element being adapted to transmit the rotation to an output shaft connected to the drive wheel; a case to house the gear assembly unit therein; and a rotation regulation means including a first coupler and a one-way clutch, the coupler and the one-way clutch being connected to the third element of the gear assembly unit, either of the coupler and the one-way clutch being disposed between the third element and the case, the other being disposed between the third element and a different one of the elements, so that the output shaft is only allowed to rotate in one direction when the coupler is coupled.

17 Claims, 11 Drawing Sheets

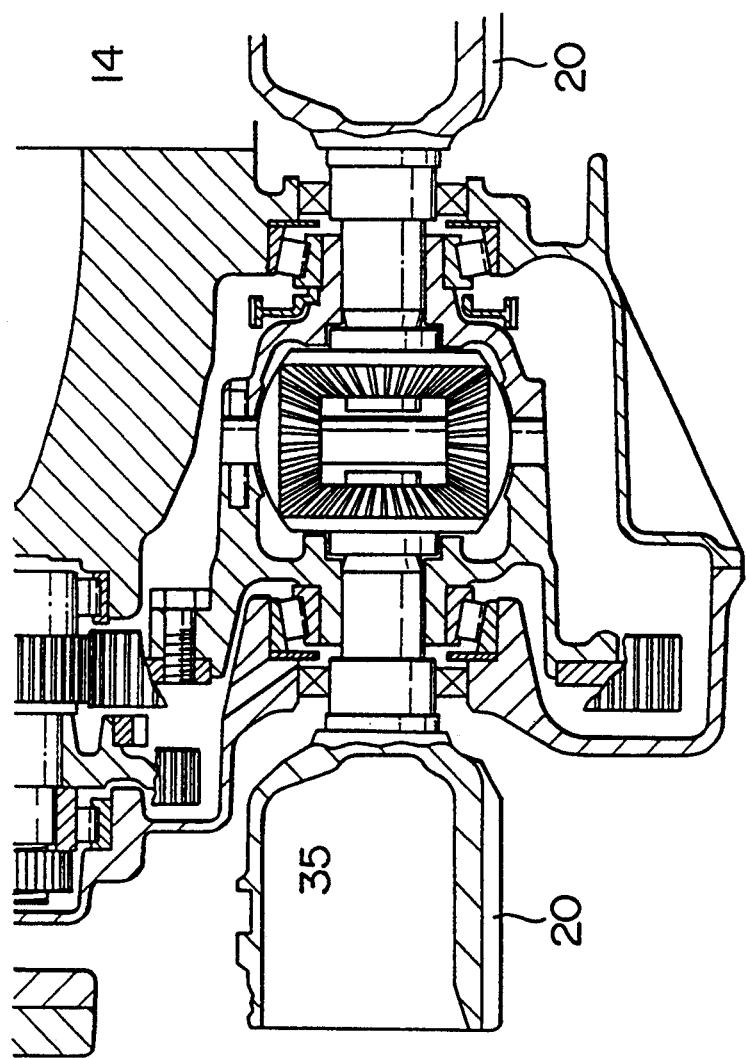
FIG.I(B)
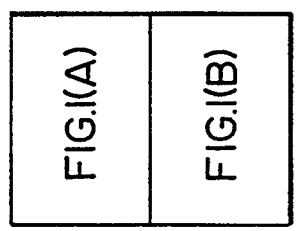

ELECTRIC MOTOR DRIVE SYSTEM

BACKGROUND OF THE INVENTION

1. Field of the Invention

This invention is broadly concerned with an electric motor drive system in a so-called hybrid vehicle and particularly to a structure for regulating the rotational direction of an output shaft of the hybrid vehicle.

2. Description of the Related Art

Heretofore, various hybrid vehicles have been proposed, which are driven for running by combined or hybrid drive including an engine and an electric motor. As a typical brake system of many such hybrid vehicles, a mechanical brake, such as a disk brake or a drum brake, is provided on a drive wheel or like wheel.

For smoothly up-slope starting such a hybrid vehicle, that is, for smoothly starting the vehicle from the parking state thereof along an upward slope, it is an essential requirement to accelerate the vehicle accurately by accompanying the de-coupling of the mechanical brake. When up-slope starting the hybrid vehicle by driving the electric motor, the motor is started from the zero rpm state. This means that the vehicle is subjected to retreat or abrupt start unless the accelerator pedal is depressed in proper extent and at proper timing with respect to the timing of the brake de-coupling.

Also, when up-slope starting the hybrid vehicle by driving the engine, like the case of the up-slope start by driving the electric motor, retreat or abrupt start is liable despite steady engine rotation.

To avoid the above undesired possibilities, it has been proposed to provide the hybrid vehicle with an electric brake in addition to the mechanical brake (as disclosed in Japanese Patent Laid-Open No. 62-95903).

Such a hybrid vehicle employs an electric motor, which is power supply controlled according to a command value calculated from the accelerator pedal depression extent, brake pedal depression extent, etc. detected by an acceleration sensor, a braking sensor, etc.

For example, when the brake pedal is depressed to stop a hybrid vehicle, not only the conventional mechanical brake is rendered operative, but also a reverse current is supplied to the electric motor in accordance with the brake pedal depression extent so that the vehicle tends to run backward, i.e., the drive wheel tends to be rotated reversely. A stopping torque is thus generated on the motor output shaft connected to the drive wheel. This has an effect of braking the vehicle.

When stopping a hybrid vehicle running forward along an up-slope, a reverse current tending to block the retreat of the vehicle is applied to the electric motor. This current has to be high compared to the current supplied to the motor to stop the vehicle on a level place. This is so because the vehicle tends to be retreated due to the inclination of the slope.

When up-slope starting the hybrid vehicle, a normal or forward current is supplied to the electric motor according to a command value calculated from the accelerator and brake pedal depression extent, etc.

The hybrid vehicle thus can be started smoothly along the up-slope without possibility of retreat or abrupt start.

Meanwhile, the electric brake noted above is such that current is supplied to only in-phase coils of the electric motor in the parked state of the hybrid vehicle. This means that the heat capacity of the power supply element such as a transistor possibly becomes insufficient.

Particularly, when stopping the hybrid vehicle on a slope, a high current is supplied to the in-phase coils, thus resulting in pronounced heat capacity shortage of the transistor or like power supply element.

An object of the invention is to provide a structure for regulating the rotational direction of the output shaft of a hybrid vehicle, which permits smooth start of a hybrid vehicle along an up-slope and also permits stopping of the vehicle without possibility of the heat capacity shortage of the power supply element.

SUMMARY OF THE INVENTION

One feature of the invention to attain the above object resides in a structure, which comprises a torque generating means for driving a drive wheel; a gear assembly unit including a first to a third element, the first element being adapted to receive a rotation from the torque generating means and the second element being adapted to transmit the rotation to an output shaft connected to the drive wheel; a case to house the gear assembly unit therein; and a rotation regulation means including a first coupler and a one-way clutch, the coupler and the one-way clutch being connected to the third element of the gear assembly unit, either of the coupler and the one-way clutch being disposed between the third element and the case, the other being disposed between the third element and a different one of the elements, so that the output shaft is only allowed to rotate in one direction when the coupler is coupled.

The gear assembly unit is preferably a planetary gear unit consisting of a sun gear, a carrier and a ring gear. The first to third elements of the planetary gear unit are a carrier, a ring gear and a sun gear, respectively, the first coupler being disposed between the sun gear and the case, the one-way clutch being disposed between the sun gear and the carrier.

Otherwise, the first to third elements of the planetary gear unit are a ring gear, a carrier and a sun gear, respectively, the one-way clutch being disposed between the sun gear and the case, the first coupler being disposed between the sun gear and the carrier. Incidentally, the first coupler is preferably disposed between the sun gear and the case.

Furthermore, the first to third elements of the planetary gear unit could be a sun gear, a carrier and a ring gear, respectively, the one-way clutch being disposed between the ring gear and the case, the first coupler being disposed between the ring gear and the carrier. In this state, the second coupler is disposed between the ring gear and the case.

The first to third elements of the planetary gear unit could be a carrier, a sun gear and a ring gear, respectively, the one-way clutch being disposed between the ring gear and the carrier, and the first coupler being disposed between the ring gear and the case. Incidentally, the second coupler is preferably disposed between the ring gear and the carrier.

Furthermore, the first to third elements of the planetary gear unit could be a carrier, a ring gear and a sun gear, respectively, the first coupler being disposed between the sun gear and the case, and the one-way clutch being disposed between the sun gear and the ring gear. In this state, the second coupler is preferably disposed between the sun gear and the ring gear.

This electric motor drive system can further comprises a second coupler in a parallel state to the one-way clutch.

The torque generating means is an internal combustion engine connected to the first element of the gear assembly unit.

The electric motor drive system can further comprises an electric motor for the output shaft to rotate the drive wheel.

The torque generating means is an electric motor.

The torque generating means consists of an electric motor and an internal combustion engine.

The electric motor drive system could further comprises an acceleration sensor to detect the vehicle speed and a controller to effect the first coupler when the vehicle speed is less than a predetermined speed.

The hybrid vehicle thus can run normally without possibility of reverse rotation of the drive wheel.

When it is intended to stop the hybrid vehicle on an up-slope, the vehicle tends to retreat due to the inclination of the slope, thus tending to cause reverse rotation of the drive wheel. Actually, however, the vehicle does not retreat because the motor output shaft, i.e., the ring gear, connected to the drive wheel is not allowed to be rotated reversely. When the sun gear is coupled by the coupler to the case, the whole planetary gear unit is secured to the case. In this state, the drive wheel is not allowed to be rotated forward as well. Thus, the hybrid vehicle can be reliably held parked.

According to the invention, with an intent of stopping the hybrid vehicle on a slope the rotation of the drive wheel is blocked mechanically, thus precluding heat capacity shortage of the power supply element as is the case with the prior art electric brake.

Further, by de-coupling the coupler when up-slope starting the hybrid vehicle, the output shaft is allowed to be rotated in the forward direction only. In this situation, depression of the accelerator pedal as desired causes smooth start of the hybrid vehicle without possibility of retreat.

BRIEF DESCRIPTION OF THE DRAWINGS

FIG. 1(B) shows the output section;

DETAILED DESCRIPTION OF THE PREFERRED EMBODIMENT(S)

Preferred embodiments of the invention will now be described with reference to the drawings. Each embodiment given below concerns a hybrid vehicle having a hybrid drive including an engine and an electric motor for running.

Figure 1A:
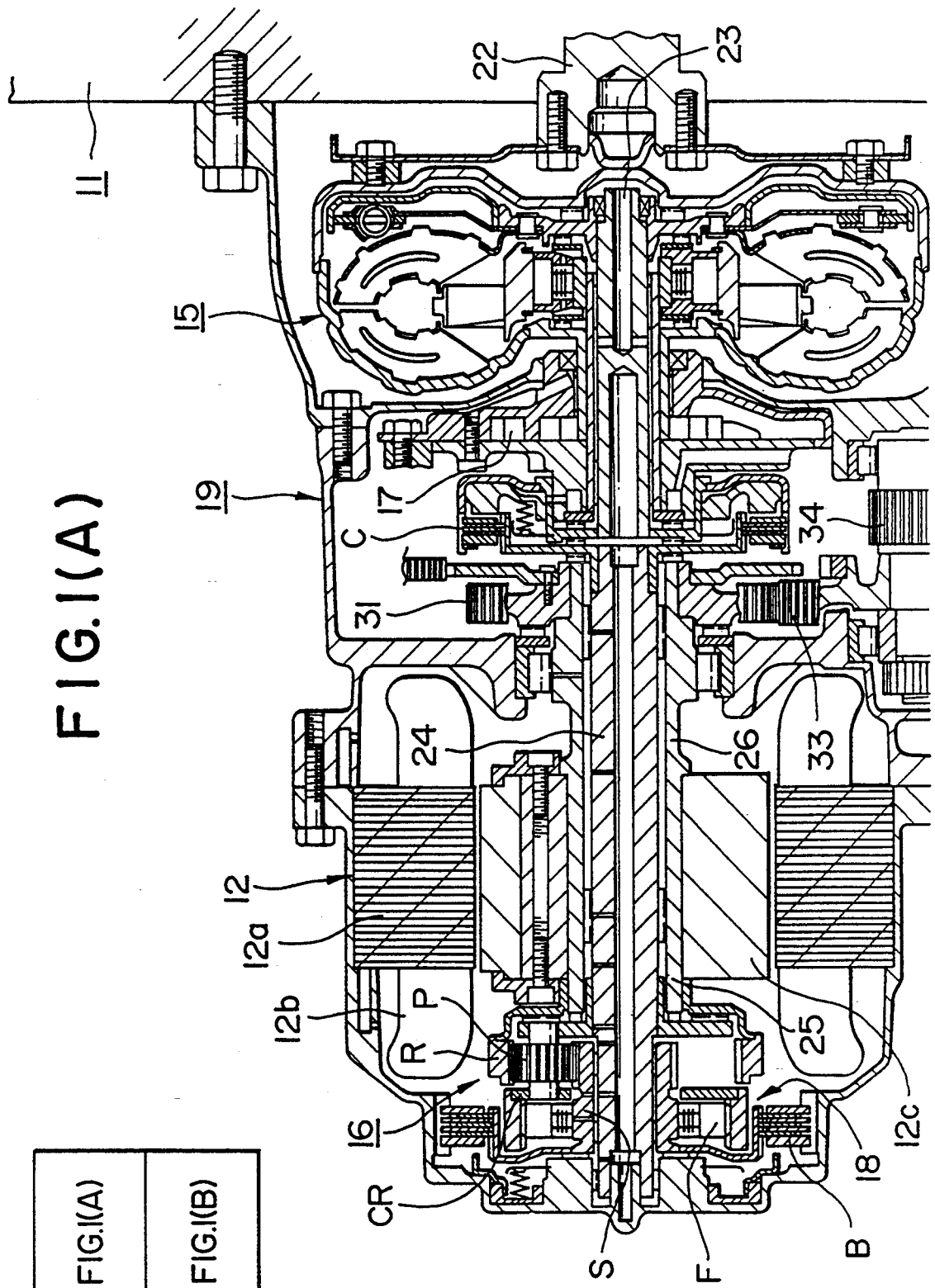
FIG. 1(A) is a schematic sectional view depicting a first embodiment of the invention.
Figure 2:
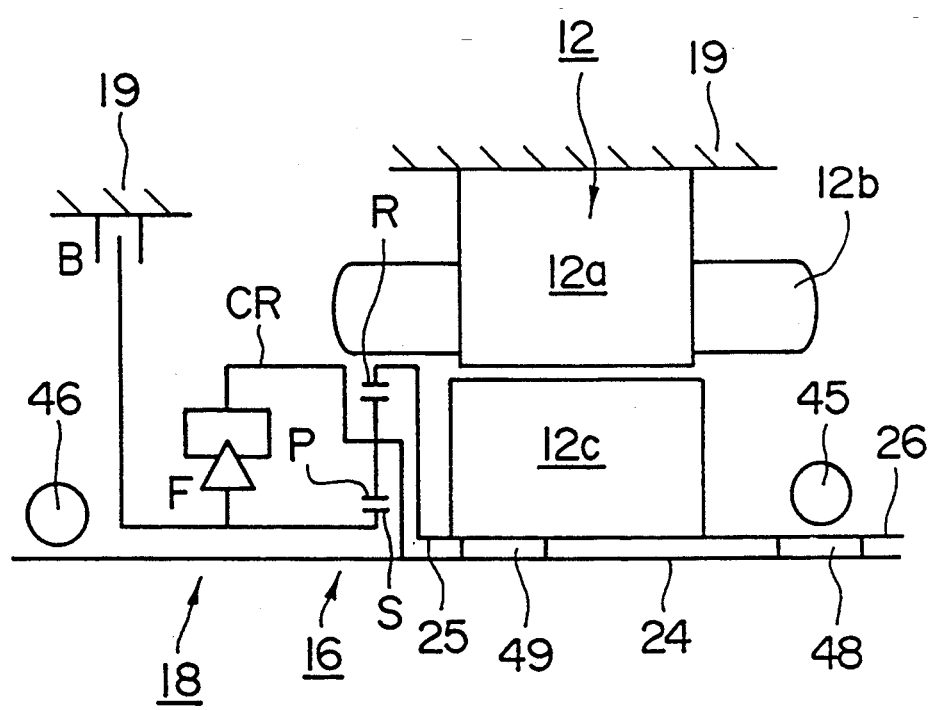
FIG. 2 is a sectional view depicting the essential part of the same embodiment.
Figure 3:
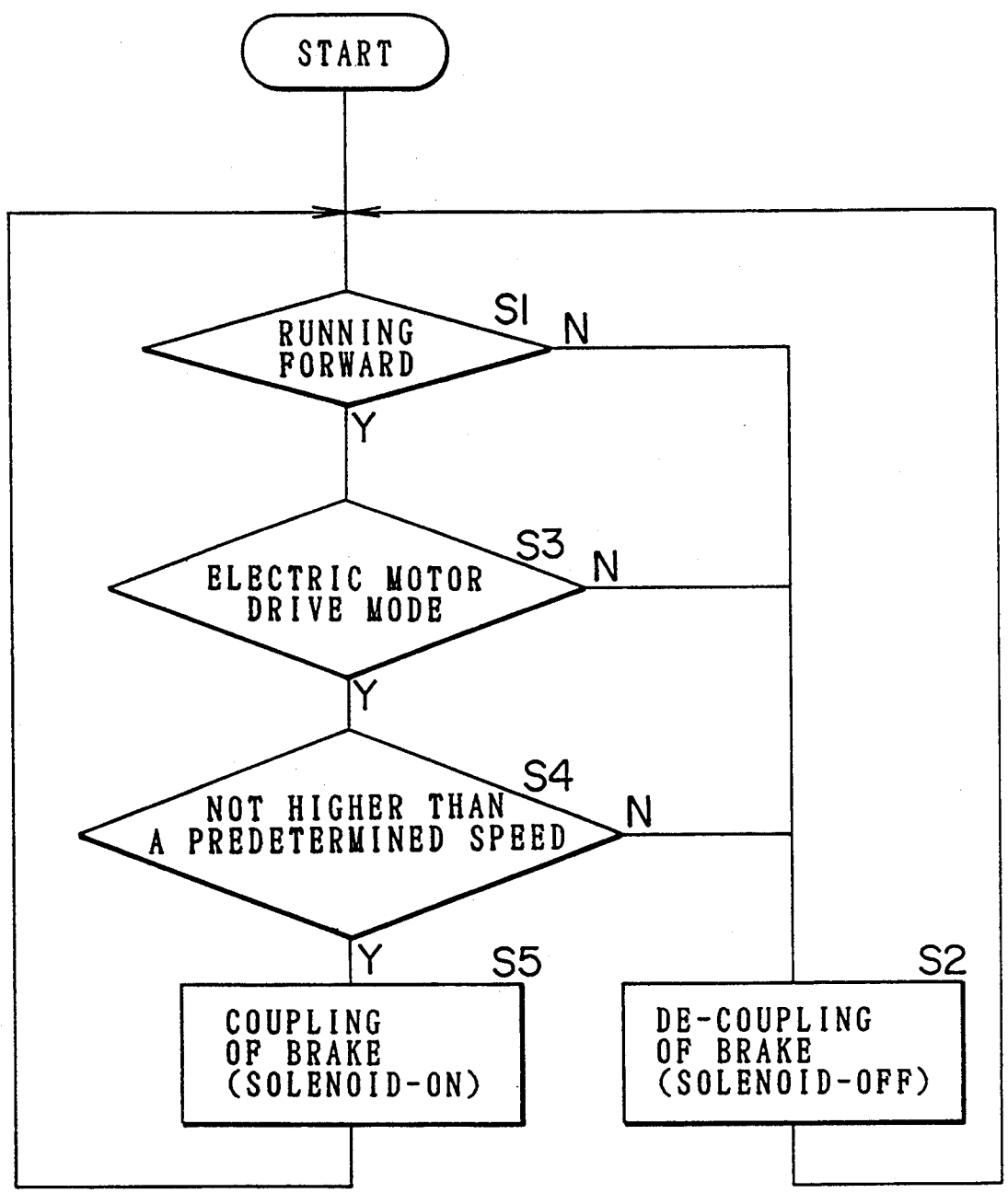
FIG. 3 is a flow chart illustrating the operation of the same embodiment.

FIGS. 1 to 3 illustrate a first embodiment of the invention. Specifically, FIG. 1 is a schematic sectional view depicting a structure 10 for regulating the rotational direction of the output shaft of a hybrid vehicle, FIG. 2 is a sectional view depicting the essential part of the structure 10, and FIG. 3 is a flow chart illustrating the operation of the structure 10.

Referring to the Figures, designated at 11 is an engine driven selectively, at 12 an electric motor driven selectively, at 14 a differential unit, at 15 a torque converter as a fluid transmission unit, at C a clutch which can be coupled in an engine drive mode of running by an engine torque generated by the engine 11, at 16 a planetary Gear unit, and at 17 an oil pump.

The planetary Gear unit 16 is of single planetary type including a ring gear R, a sun gear S and a carrier CR supporting a pinion as respective first to third elements. Designated at B is a brake which can selectively couple and de-couple the sun Gear S, and at F a one-way clutch. The planetary gar unit 16, brake B and one-way clutch F constitute a transmission 18.

Designated at 19 is a case, in which the electric motor 12, differential unit 14, torque converter 15, clutch C and transmission 18 are accommodated. Designated at 20 is a drive shaft which can transmit reduced speed rotation or differential rotation from the differential unit 14 to a drive wheel (not shown).

Designated at 22 is an output shaft of the engine 11, at 23 an output shaft of the torque converter, at 24 an input shaft of the transmission 18, and at 25 an output shaft of the transmission 18. Designated at 26 is an output shaft of the electric motor 12. The output shaft 26 is rotatable in unison with the output shaft 25 of the transmission 18.

The electric motor 12 includes a stator core 12a accommodated in and secured to the case 19, a stator coil 12b wound on the stator core 12a and a rotor 12c coupled to the output shaft 26. The rotor 12c can be rotated by supplying current to the stator coil 12b.

The rotation of the engine 11 or electric motor 12 is transmitted to a counter drive gear 31, which is secured in a predetermined position on the side of the engine 11 rather than the side of the motor 12.

A counter drive shaft 32 extends substantially parallel to the output shaft 26, and it has a counter drive gear 33. The counter drive gear 33 is in mesh with the counter drive gear 31, the rotation of which is transmitted to an output gear 34.

The rotation of the output gear 34 is transmitted to an output large gear 35 in mesh with the output gear 34. The output large gear 35 has a number of teeth greater than the number of teeth of the output gear 34, and it constitutes a final speed reduction unit to transmit rotation to the drive wheel. Reduced speed rotation from this final speed reduction unit is transmitted through the differential unit 14 and in a differential state to each drive shaft 20.

In the above structure of this embodiment, in the engine drive mode, in which the sole engine 11 is driven without energization of the electric motor 12, the rotation of the engine 11 is transmitted via the output shaft 22 to the torque converter 15, and then thence through the output shaft 23 to the clutch C. When the clutch C is coupled, the rotation transmitted to the output shaft 23 is transmitted via the input shaft 24 to the carrier CR of the planetary gear unit 16.

The planetary gear unit 16 is arranged such that when the brake B is released, the rotation input to the carrier CR locks the one-way clutch to provide a state of direct coupling, and the rotation of the input shaft 24 is transmitted without speed reduction to the output shafts 25 and 26. When the brake B is coupled, the sun gear S is secured to the case 19, and increased speed rotation from the ring gear R is transmitted via the output shafts 25 and 26 to the counter drive gear 31.

The rotation transmitted to the counter drive gear 31 is transmitted via the counter drive gear 33 to the counter drive shaft 32 to be speed reduced in the final speed reduction unit constituted by the output gear 34 and output large gear 35 before being transmitted to the differential unit 14. In this case, the hybrid vehicle is driven for running by the sole engine 11.

In the electric motor drive mode, in which the sole electric motor 12 is driven with the engine 11 held inoperative, the motor 12 generates motor torque. The motor torque from the motor 12 is output to the output shaft 26 to be transmitted to the counter drive gear 31 as in the above mode case. In this case, the hybrid vehicle is driven for running by the sole motor 12.

In the engine/electric motor drive mode, in which the electric motor 11 is driven with the clutch C coupled while also holding the engine 11 operative, the hybrid vehicle is driven by both the engine and motor 12. Thus, even in the event of a trouble in the motor 12 or a motor controller (not shown), the hybrid vehicle can run as it is driven by the engine 11.

The transmission 18 is operated by oil hydraulic circuit (not shown), and the brake B has an oil hydraulic servo (not shown). The brake B can be coupled and de-coupled by selectively supplying operating fluid to the oil hydraulic servo with on-off operation of a solenoid in the oil hydraulic circuit.

The input shaft 24 of the transmission 18 is connected to the carrier CR, and the planetary gear unit 16 is supported on the input shaft 24. The output shaft 25 of the transmission 18 is connected to the ring gear R. The output shaft 26 of the motor 12 is rotatable in unison with the output shaft 25. The output shaft 26 is supported for rotation in a bearing 45, and the output shaft 24 is supported for rotation in a bearing 46. Bearings 48 and 49 permit rotation of the output shafts 24 and 26 relative to each other.

In the hybrid vehicle as shown above, the electric motor is controlled by a CPU (not shown). The CPU includes a microprocessor, a RAM, etc. to control current supplied to the motor.

As shown in FIG. 3, when stopping the hybrid vehicle, the CPU checks whether the vehicle is running forward (step S1). Then, it checks whether the vehicle is in the electric motor drive mode (step S3). Then, it checks whether the vehicle speed is not higher than a predetermined speed (step S4). If the vehicle speed is not higher than the predetermined speed, the CPU turns on the solenoid in the oil hydraulic circuit to couple the brake B so as to secure the sun gear S to the case 19 (step S5).

That is, the carrier CR and the sun gear S are coupled to each other via the one-way clutch F. Thus, the carrier CR and the ring gear R can no longer be reversely rotatable because the one-way clutch C is coupled to the case 19.

If "NO" yields in any of the above steps S1 and S3 to S5, the routine goes to a step S2 to turn off the oil hydraulic circuit solenoid to de-couple the brake B so as to bring the planetary gear unit 16 to a state of direct coupling.

As shown above, with the above construction it is possible with the brake pedal depression to stop the hybrid vehicle running along a slope with the carrier CR and ring gear R held incapable of reverse operation. Thus, it is possible by appropriately depressing the accelerator pedal to up-slope start the hybrid vehicle without possibility of retreat.

In addition, since in this embodiment the hybrid vehicle is parked on a slope in a mechanically locked state, unlike the case of the prior art electric brake, there is no possibility that the heat capacity of the power supply element becomes insufficient due to current supply to the sole in-phase coils.

Figure 4:
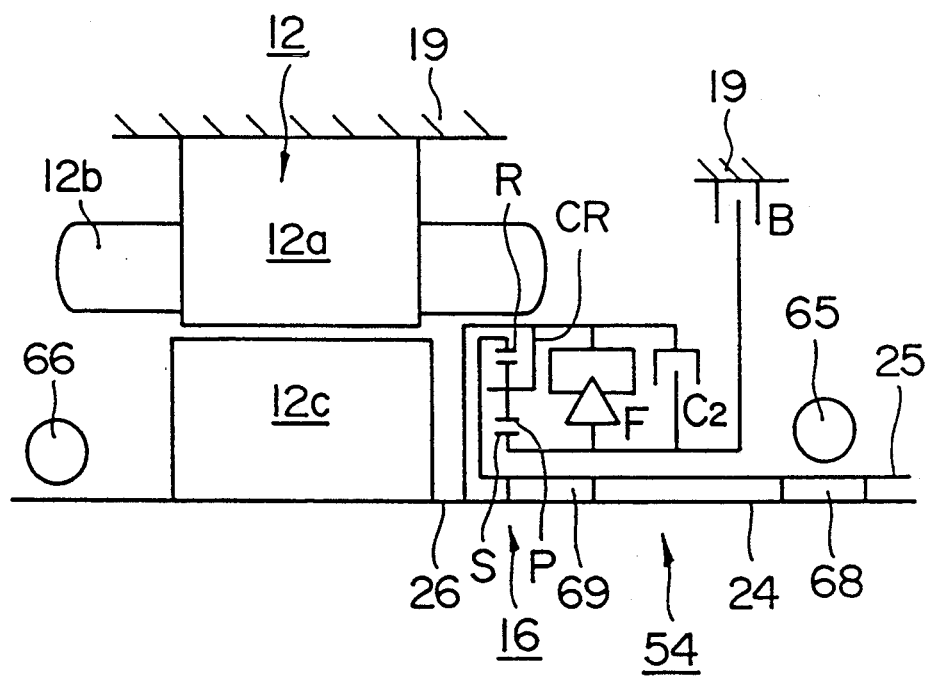
FIG. 4 is a schematic sectional view depicting a second embodiment of the invention.

FIG. 4 shows a second embodiment of the invention. In the Figure, parts like those in the preceding first embodiment are designated by like reference numerals and symbols, and are not described any further. This also applies to further embodiments given hereinafter.

Referring to the Figure, designated at 65, 66, 68 69 are bearings, and at C2 a second clutch for selectively coupling and de-coupling the carrier CR and sun gear S. Planetary gear unit 16, brake B, one-way clutch F and second clutch C2 constitute a transmission 54.

The transmission 54 functions as follows. When the brake B is coupled with the second clutch C2 de-coupled, the rotation input to the carrier CR tends to cause rotation of the sun gear S in the same direction. However, since the brake B is coupled, the sun gear S can not be rotated. Consequently, the ring gear R outputs increased speed rotation.

When the brake B is de-coupled with the second clutch C2 coupled, the planetary gear unit 16 is brought to the state of direct coupling. Consequently, the rotation of the input shafts 24 and 26 is transmitted without speed change to the output shaft 25.

With this embodiment, which has substantially the same construction as the first embodiment, substantially the same effects as those in the first embodiment are obtainable.

Meanwhile, in this embodiment by coupling the brake B with the second clutch C2 de-coupled it is possible to obtain an increased speed rotation output from the ring gear R. Thus, the hybrid vehicle can be high speed started from the parked state.

Figure 5:
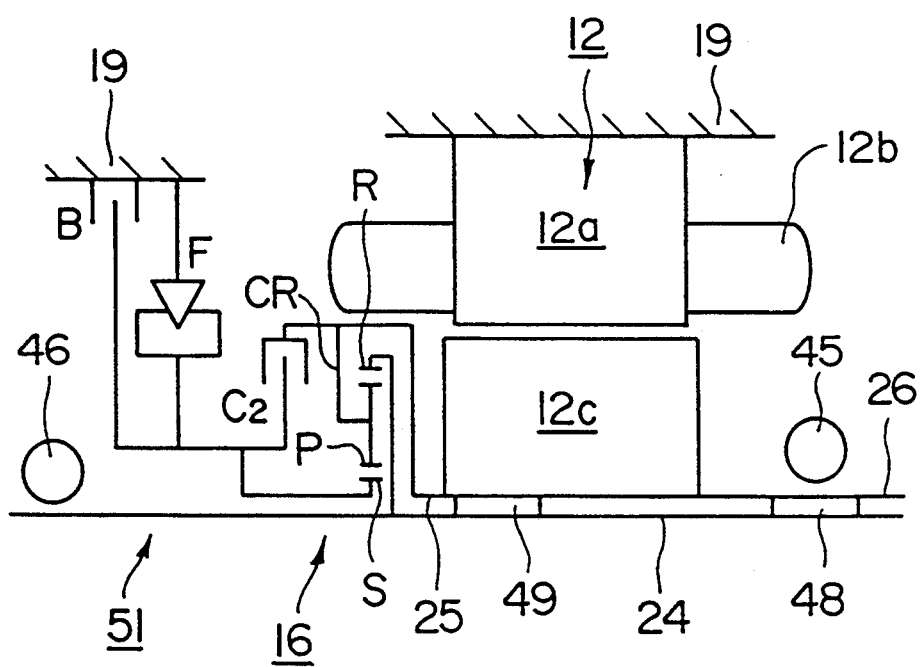
FIG. 5 is a schematic sectional view depicting a third embodiment of the invention.

FIG. 5 shows a third embodiment of the invention. Referring to the Figure, designated at 45, 46, 48 and 49 are bearings, and at C2 a second clutch which can selectively couple and de-couple the carrier CR and sun gear S. Planetary gar unit 16, brake B, one-way clutch F and second clutch C2 constitute a transmission 51.

The transmission 51 functions as follows. When the second clutch C2 is de-coupled, the rotation input to the ring gear R tends to cause rotation of the sun gear S in the reverse direction. However, since the one-way clutch F is locked, the sun gear S can not be rotated reversely. Consequently, the carrier CR outputs reduced speed rotation.

When the second clutch C2 is coupled, the planetary gear unit 16 is brought to a state of direct coupling. Consequently, the rotation of the input shafts 24 and 26 is transmitted without speed change to the output shaft 25.

Further, when the second clutch C2 is de-coupled with the brake B coupled, the sun gear S is secured, so that engine brake can be provided.

Again with this embodiment, which has substantially the same construction as the preceding first and second embodiments, substantially the same effects as those in the first and second embodiments are obtainable.

Figure 6:
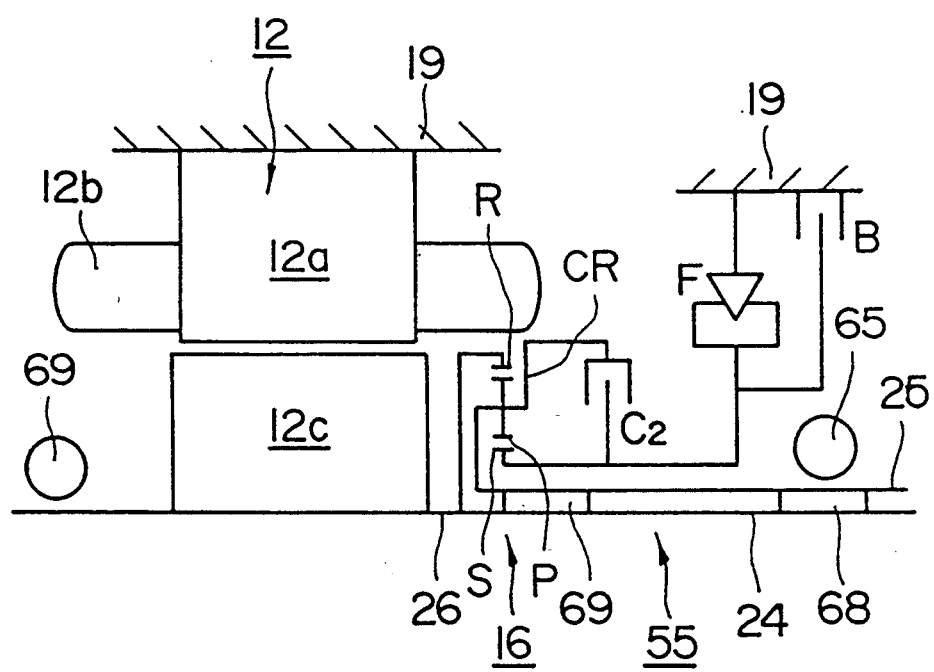
FIG. 6 is a schematic sectional view depicting a fourth embodiment of the invention.

FIG. 6 shows a fourth embodiment of the invention. Referring to the Figure, designated at 65, 66, 68 and 69 are bearings, and at C2 a second clutch which can selectively couple and de-couple the carrier CR and sun gear S. Planetary gear unit 16, brake B, one-way clutch F and second clutch C2 constitute a transmission 55.

The transmission 55 functions as follows. When the brake B is coupled with the second clutch C2 de-coupled, the rotation input to the ring gear R tends to cause rotation of the sun gear S in the reverse direction. However, since the brake B is coupled, the sun gear S can not be rotated reversely. Consequently, the carrier CR outputs reduced speed rotation.

When the brake B is de-coupled with the second clutch C2 coupled, the planetary gear unit is brought to a state of direct coupling. Consequently, the rotation of the input shafts 24 and 26 is transmitted without speed change to the output shaft 25.

With this embodiment, which has substantially the same construction as the preceding first and second embodiments, substantially the same effects as those in the first and second embodiments are obtainable.

Figure 7:
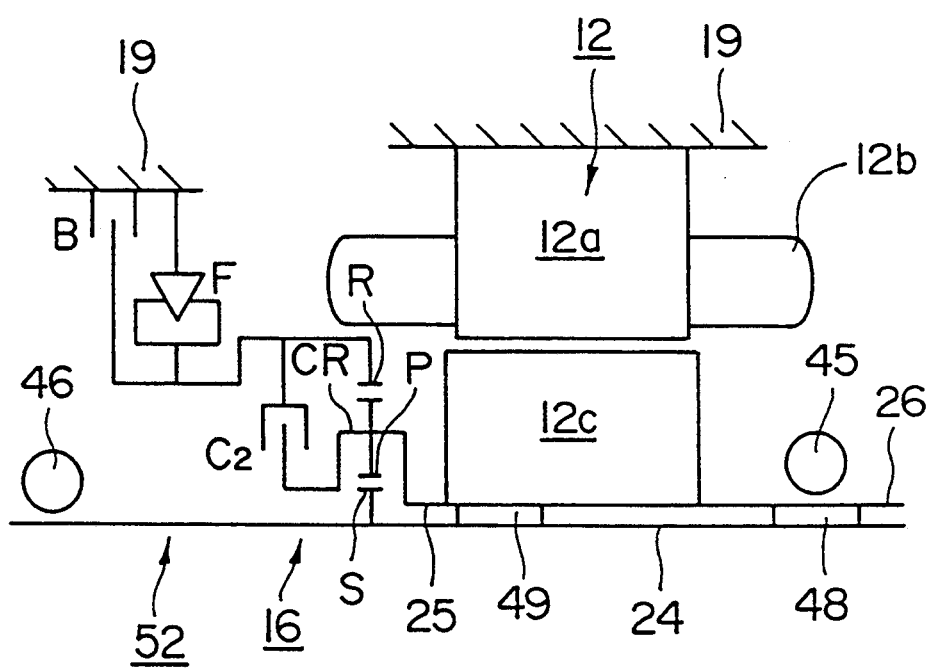
FIG. 7 is a schematic sectional view depicting a fifth embodiment of the invention.

FIG. 7 shows a fifth embodiment of the invention. Referring to the Figure, designated at 45, 46, 48 and 49 are bearings, at C2 a second clutch which can selectively couple and de-couple the carrier CR and ring gear R. Planetary gear unit 16, brake B, one-way clutch F and second clutch C2 constitute a transmission 52.

The transmission functions as follows. When the second clutch C2 is de-coupled, the rotation input to the sun gear S tends to cause rotation of the ring gear R in the reverse direction. However, since the one-way clutch F is locked, the ring gear R can not be rotated reversely. Consequently, the carrier CR outputs reduced speed rotation.

When the second clutch C2 is coupled, the planetary gear unit 16 is brought to a state of direct coupling. Consequently, the rotation of the input shafts 24 and 26 is transmitted without speed change to the output shaft 25.

When the second clutch C2 is de-coupled with the brake B coupled, the ring gear R is secured, so that engine brake can be provided.

With this embodiment, which has substantially the same construction as those in the previous third embodiment, substantially the same effects as those in the third embodiment are obtainable.

Figure 8:
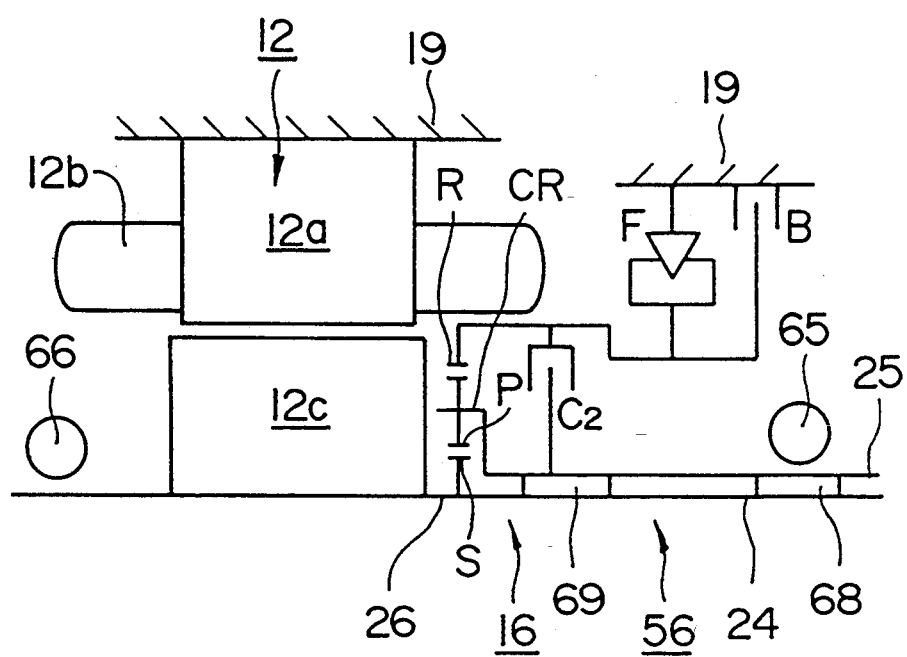
FIG. 8 is a schematic sectional view depicting a sixth embodiment of the invention.

FIG. 8 shows a sixth embodiment of the invention. Referring to the Figure, designated at 65, 66, 68 and 69 are bearings, and at C2 a second clutch which can selectively couple and de-couple the carrier CR and ring gear R. Planetary gear unit 16, brake B, one-way clutch F and second clutch C2 constitute a transmission 56.

The transmission 56 functions as follows. When the brake B is coupled with the second clutch C2 de-coupled, the rotation input to the sun gear S tends to cause rotation of the ring gear R in the reverse direction. However, since the brake B is coupled, the ring gear R can not be rotated reversely. Consequently, the carrier CR outputs reduced speed rotation.

When the brake B is de-coupled with the second clutch C2 coupled, the planetary gear unit 16 is brought to a state of direct coupling. Consequently, the rotation of the input shafts 24 and 26 is transmitted without speed change to the output shaft 25.

When the second clutch C2 is de-coupled with the brake B coupled, the ring gear R is secured, so that engine brake can be provided.

With this embodiment, which has substantially the same construction as the previous third embodiment, substantially the same effects as those in the third embodiment are obtainable.

Figure 9:
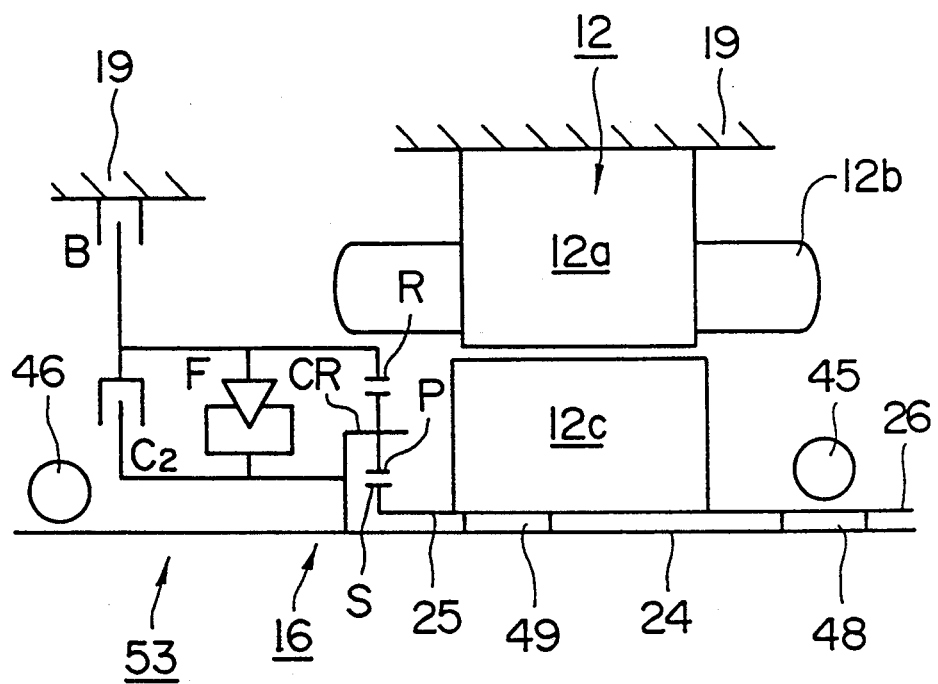
FIG. 9 is a schematic sectional view depicting a seventh embodiment of the invention.

FIG. 9 shows a seventh embodiment of the invention. Referring to the Figure, designated at 45, 46, 48 and 49 are bearings, and at C2 a second clutch which can selectively couple and de-couple the carrier CR and ring gear R. Planetary gear unit 16, brake B, one-way clutch F and second clutch C2 constitute a transmission 53.

The transmission 53 functions as follows. When the brake B is coupled with the second clutch de-coupled, the rotation input to the carrier CR tends to cause rotation of the ring gear R in the same direction. However, since the brake B is coupled, the ring gear R can not be rotated in the same direction. Consequently, the sun gear S outputs reduced speed rotation.

When the brake B is de-coupled with the second clutch C2 coupled, the planetary gear unit 16 is brought to a state of direct coupling. Consequently, the rotation of the input shafts 24 and 26 is transmitted without speed reduction to the output shaft 25.

With this embodiment, which has substantially the same construction as the first, second, fourth and fifth embodiments, substantially the same effects as those in the first, second, fourth and fifth embodiments are obtainable.

Figure 10:
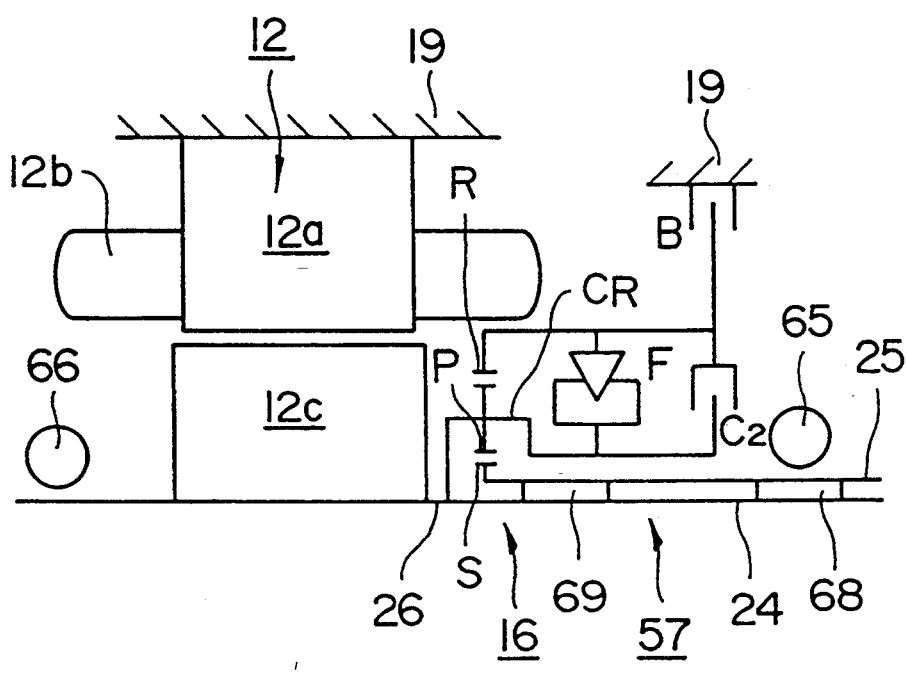
FIG. 10 is a schematic sectional view depicting an eighth embodiment of the invention.

FIG. 10 shows an eighth embodiment of the invention. Referring to the Figure, designated at 65, 66, 68 and 69 are bearings, and at C2 a second clutch which can selectively couple and de-couple the carrier CR and ring gear R. Planetary gear unit 16, brake B, one-way clutch F and second clutch C2 constitute a transmission 57.

When the brake B is coupled with the second clutch C2 de-coupled, the rotation input to the carrier CR tends to cause rotation of the ring gear R in the same direction. However, since the brake B is coupled, the ring gear R can not be rotated. Consequently, the sun gear S outputs increased speed rotation.

When the brake B is released with the second clutch C2 coupled, the planetary gear unit 16 is brought to a state of direct coupling. Consequently, the rotation of the input shafts 24 and 26 is transmitted without speed change to the output shaft 25.

With this embodiment, which has substantially the same effects as those in the first, second, fourth, fifth and seventh embodiments, substantially the same effects as those in the first, second, fourth, fifth and seventh embodiments are obtainable.

The above embodiments of the invention are by no means limitative, and various changes and modifications can be made without departing from the scope and spirit of the invention.

For example, while the planetary gear unit in each of the above embodiments has been of single planetary type, it is possible to use a double planetary type planetary gear unit as well.

Also, while the first to third elements have been the sun gear, ring gear and carrier, it is also possible that these elements are other combinations than in each of the above embodiments.

Further, while the first clutch has been a one-way clutch, it is possible to employ other suitable structures as well so long as they allow the third element to be rotated in one direction only.

As has been mentioned in these embodiments, a two-speed change is conducted by one set of the planetary gear unit. But, the planetary gear unit could be a multi-speed gear unit, for example, a four-speed gear unit.

Lastly, it is to be understood that the invention may be embodied in other specific forms without departing from the spirit or essential characteristics thereof. The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

As has been described in the foregoing, according to the invention it is possible to provide a structure for regulating the rotational direction of the output shaft of a hybrid vehicle, which permits smooth start of the vehicle along an up-slope and also permits stopping the vehicle without possibility of the heat capacity shortage of the power supply element.

What is claimed is:

1. An electric motor drive system, comprising:
a torque generating means for driving a drive wheel;
a gear assembly unit including a first to a third element, the first element being adapted to receive a rotation from said torque generating means and the second element being adapted to transmit the rotation to an output shaft connected to the drive wheel;
a case to house said gear assembly unit therein; and
a rotation regulation means including a first coupler and a one-way clutch, the coupler and the one-way clutch being connected to the third element of said gear assembly unit, either of the coupler and the one-way clutch being disposed between the third element and said case, the other being disposed between the third element and a different one of the elements, so that the output shaft is only allowed to rotate in one direction when said coupler is coupled.

2. The electric motor drive system according to claim 1, wherein said gear assembly unit is a planetary gear unit consisting of a sun gear, a carrier and a ring gear.

3. The electric motor drive system according to claim 1, further comprising a second coupler in a parallel state to the one-way clutch.

4. The electric motor drive system according to claim 1, wherein said torque generating means is an internal combustion engine connected to the first element of said gear assembly unit.

5. The electric motor drive system according to claim 4, further comprising an electric motor for the output shaft to rotate the drive wheel.

6. The electric motor drive system according to claim 1, wherein the torque generating means is an electric motor.

7. The electric motor drive system according to claim 1, wherein the torque generating means consists of an electric motor and an internal combustion engine.

8. The electric motor drive system according to claim 2, wherein the first to third elements of said planetary gear unit are a carrier, a ring gear and a sun gear, respectively, the first coupler being disposed between the sun gear and said case, the one-way clutch being disposed between the sun gear and the carrier.

9. The electric motor drive system according to claim 2, wherein the first to third elements of said planetary gear unit are a ring gear, a carrier and a sun gear, respectively, the one-way clutch being disposed between the sun gear and said case, the first coupler being disposed between the sun gear and the carrier.

10. The electric motor drive system according to claim 9, wherein the first coupler is disposed between the sun gear and said case.

11. The electric motor drive system according to claim 2, wherein the first to third elements of said planetary gear unit are a sun gear, a carrier and a ring gear, respectively, the one-way clutch being disposed between the ring gear and said case, the first coupler being disposed between the ring gear and the carrier.

12. The electric motor drive system according to claim 11, wherein the second coupler is disposed between the ring gear and said case.

13. The electric motor drive system according to claim 2, wherein the first to third elements of said planetary gear unit are a carrier, a sun gear and a ring gear, respectively, the one-way clutch being disposed between the ring gear and the carrier, and the first coupler being disposed between the ring gear and said case.

14. The electric motor drive system according to claim 13, wherein the second coupler is disposed between the ring gear and the carrier.

15. The electric motor drive system according to claim 2, wherein the first to third elements of said planetary gear unit are a carrier, a ring gear and a sun gear, respectively, the first coupler being disposed between the sun gear and said case, and the one-way clutch being disposed between the sun gear and the ring gear.

16. The electric motor drive system according to claim 15, wherein the second coupler is disposed between the sun gear and the ring gear.

17. The electric motor drive system according to claim 1, further comprising an acceleration sensor to detect the vehicle speed and a controller to effect the first coupler when the vehicle speed is less than a predetermined speed.

* * * * *